(12) United States Patent
Kim et al.

(10) Patent No.: US 9,872,180 B2
(45) Date of Patent: Jan. 16, 2018

(54) METHOD FOR MANAGING NETWORK ACCESS AND ELECTRONIC DEVICE THEREFOR

(71) Applicant: Samsung Electronics Co., Ltd., Suwon-si, Gyeonggi-do (KR)

(72) Inventors: Duk-Il Kim, Suwon-si (KR); In-Ku Kang, Gunpo-si (KR); Yu-Seung Kim, Seoul (KR); Bong-Hyun Lee, Anyang-si (KR); Dong-Ho Jang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/842,243

(22) Filed: Sep. 1, 2015

(65) Prior Publication Data

US 2016/0066186 A1 Mar. 3, 2016

(30) Foreign Application Priority Data

Sep. 1, 2014 (KR) .......................... 10-2014-0115075

(51) Int. Cl.
| | | |
|---|---|---|
| *H04W 40/24* | (2009.01) | |
| *H04W 12/08* | (2009.01) | |
| *H04M 15/00* | (2006.01) | |
| *H04W 4/24* | (2009.01) | |
| *H04W 4/00* | (2009.01) | |

(52) U.S. Cl.
CPC .......... *H04W 12/08* (2013.01); *H04M 15/60* (2013.01); *H04W 4/001* (2013.01); *H04W 4/24* (2013.01)

(58) Field of Classification Search
CPC ........ H04H 20/57; H04H 60/44; H04H 60/66; H04H 60/91; H04N 21/44222; H04N 21/6181; H04N 21/6582; H04W 12/02; H04W 24/10; H04W 4/20; H04W 12/08; H04W 4/001; H04W 4/24; H04L 29/12188; H04L 29/12245; H04L 29/12283; H04L 41/0806; H04L 61/1588; H04L 61/203; H04L 61/2061; H04M 15/60
See application file for complete search history.

(56) References Cited

U.S. PATENT DOCUMENTS

| | | |
|---|---|---|
| 8,531,947 B2 | 9/2013 | Zhao et al. |
| 2007/0010231 A1 | 1/2007 | Du |
| 2007/0226780 A1* | 9/2007 | Ronneke ............. H04L 63/0227 726/3 |

(Continued)

FOREIGN PATENT DOCUMENTS

| | | |
|---|---|---|
| JP | 2013-141106 A | 7/2016 |
| KR | 10-2012-0012991 A | 2/2012 |

(Continued)

*Primary Examiner* — Quan M Hua
(74) *Attorney, Agent, or Firm* — Jefferson IP Law, LLP

(57) ABSTRACT

A method for managing network access is provided. The method includes determining whether there is a network connection request from at least one application, checking at least one attribute information item of the application, determining an access point name (APN) corresponding to the application based on the at least one attribute information item, and transmitting and receiving data of the application to/from a network using the determined APN.

8 Claims, 14 Drawing Sheets

(56) References Cited

U.S. PATENT DOCUMENTS

| | | | |
|---|---|---|---|
| 2011/0131338 A1* | 6/2011 | Hu | H04W 76/02 709/229 |
| 2012/0069763 A1 | 3/2012 | Zhao et al. | |
| 2012/0207094 A1* | 8/2012 | Liao | H04W 4/005 370/328 |
| 2013/0051313 A1 | 2/2013 | Durand et al. | |
| 2014/0161042 A1 | 6/2014 | Shaw et al. | |
| 2014/0279454 A1* | 9/2014 | Raman | H04L 63/08 705/40 |
| 2014/0359102 A1* | 12/2014 | Kihara | H04L 63/107 709/223 |

FOREIGN PATENT DOCUMENTS

| | | |
|---|---|---|
| KR | 10-2012-0043920 A | 5/2012 |
| KR | 10-2014-0054328 A | 5/2014 |
| WO | 2013/173270 A2 | 11/2013 |

\* cited by examiner

| Name | UID | User ID | Security Level | VPN | Data |
|---|---|---|---|---|---|
| Email | 938472843 | 1 | H | Y | ... |
| Internet | 243452345 | 0 | M | N | ... |
| Calender | 342134546 | 2 | H | N | ... |

| Name | UID | User ID | Security Level | VPN | Data | IP address | APN |
|---|---|---|---|---|---|---|---|
| Email | 938472843 | 1 | H | Y | ... | IP 1 | Normal |
| Internet | 243452345 | 0 | M | N | ... | IP 2 | ENT 1 |
| Calender | 342134546 | 2 | H | N | ... | IP 3 | ENT 2 |

METHOD FOR MANAGING NETWORK ACCESS AND ELECTRONIC DEVICE THEREFOR

CROSS-REFERENCE TO RELATED APPLICATION(S)

This application claims the benefit under 35 U.S.C. § 119(a) of a Korean patent application filed in the Korean Intellectual Property Office on Sep. 1, 2014 and assigned Serial No. 10-2014-0115075, the entire disclosure of which is incorporated herein by reference.

TECHNICAL FIELD

Various embodiments of the present disclosure relate to a method for managing network access and an electronic device therefor.

BACKGROUND

Subscribers existing in the wireless communication network may access the Internet in any environments through an electronic device capable of Internet access.

Various services that can be provided in the Internet or the like may require different transmission capacities depending on their characteristics. For example, a video on demand (VOD) service may require a very high transmission capacity, since the VOD service should be composed of large amounts of video data and audio data.

In the current communication network, the links between nodes may be designed to have a limited transmission capacity. If many subscribers simultaneously access the network and enjoy an application in which transmission of large amounts of data is required, exceeding the limited transmission capacity of the links, the service may be unavailable, which may degrade the overall network service experience.

To improve these problems, the mobile operators have changed the high transmission capacities of the nodes or have expanded new equipments, but this may require a very high cost. Besides, the amount of data transmitted and received is on an exponentially increasing trend along with the development of numerous applications.

In a case where an application that uses a lot of data is frequently enjoyed by the user in an electronic device such as a smart phone, the application may frequently use or access the mobile communication network regardless of the user's intentions, causing billing issues.

Further, at present, since only one access point name (APN) is allocated and used for each electronic device in order for the electronic device to access the same network, there has been no way in which the use of network resources can be differently treated for different applications run in the electronic device. This may have a negative effect on the profits of the service providers.

The above information is presented as background information only to assist with an understanding of the present disclosure. No determination has been made, and no assertion is made, as to whether any of the above might be applicable as prior art with regard to the present disclosure.

SUMMARY

An aspect of the present disclosure is to address at least the above-mentioned problems and/or disadvantages and to provide at least the advantages described below. Accordingly, an aspect of various embodiments of the present disclosure is to provide a network access management method for distinguishing the network to which data should be transmitted, for each application, and an electronic device therefor.

Another aspect of various embodiments of the present disclosure is to provide a method for managing network access so that the billing target data distinguished for each application can be transmitted, and an electronic device therefor.

In accordance with an aspect of the present disclosure, there is provided a method for managing network access. The method includes determining whether there is a network connection request from at least one application; checking at least one attribute information item of the application; determining an access point name (APN) corresponding to the application based on the at least one attribute information item; and transmitting and receiving data of the application to/from a network using the determined APN.

In accordance with another aspect of the present disclosure, there is provided an electronic device for managing network access. The electronic device includes a processor configured to, upon a network connection request from at least one application, check at least one attribute information item of the application, and determine an access point name (APN) corresponding to the application based on the at least one attribute information item; and a communication unit configured to transmit and receive data of the application to/from a network using the determined APN.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which:

FIGS. 8A and 8B illustrate mapping tables according to various embodiments of the present disclosure;

Throughout the drawings, like reference numerals will be understood to refer to like parts, components, and structures.

DETAILED DESCRIPTION

Figure 1:
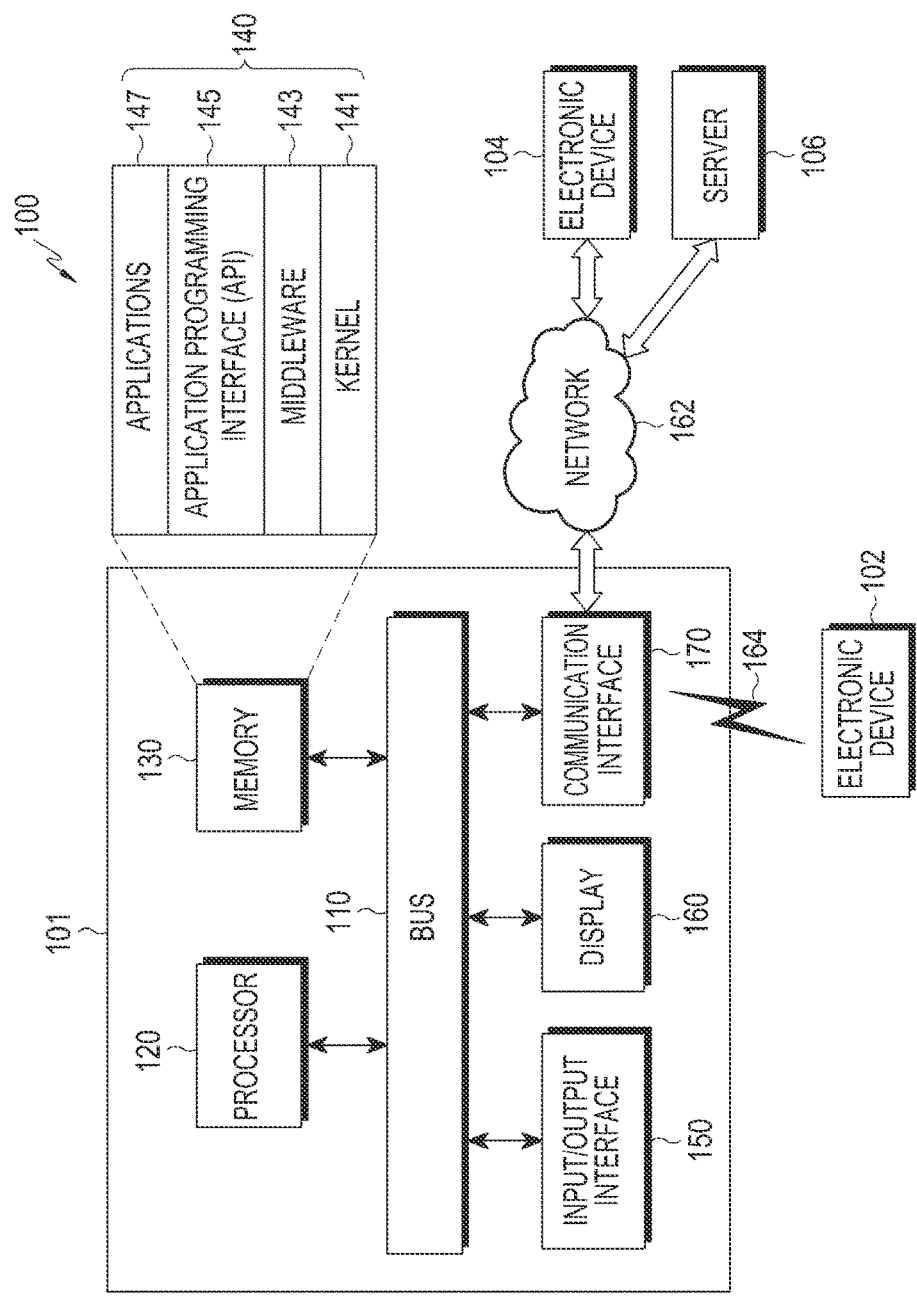
FIG. 1 illustrates a network environment including an electronic device according to various embodiments of the present disclosure.

Hereinafter, embodiments of the present disclosure are described with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B" or "at least one of A and/or B" includes any and all combinations of one or more of the associated listed items. For examples, "A or B" or "at least one of A or/and B" each may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, according to various embodiments of the present disclosure, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various embodiments of the present disclosure may include at least one of, for example, a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, a mobile medical device, a camera, or a wearable device (e.g., smart glasses, a head-mounted-device (HMD), electronic clothing, an electronic bracelet, an electronic necklace, an electronic App accessory (or appcessory), electronic tattoo, a smart mirror, or a smart watch.).

In some embodiments, the electronic device may be a smart home appliance. The smart home appliance may include at least one of, for example, a television (TV), a digital video disk (DVD) player, an audio player, a refrigerator, an air conditioner, a cleaner, an oven, a microwave oven, a washer, an air purifier, a set-top box, a home automation control panel, a security control panel, a TV box (e.g., a Samsung HomeSync™, an Apple TV™, or a Google TV™), a game console (e.g., Xbox™ or PlayStation™), an electronic dictionary, an electronic key, a camcorder or a digital photo frame.

In another embodiment, the electronic device may include at least one of various medical devices (e.g., various portable medical meters (e.g., a blood glucose meter, a heart rate meter, a blood pressure meter, a temperature meter or the like), magnetic resonance angiography (MRA), magnetic resonance imaging (MRI), computed tomography (CT), a medical camcorder, an ultrasonic device or the like), a navigation device, a global positioning system (GPS) receiver, an event data recorder (EDR), a flight data recorder (FDR), an automotive infotainment device, a marine electronic device (e.g., a marine navigation device, a gyro compass or the like), avionics, a security device, a car head unit, an industrial or home robot, an automatic teller's machine (ATM) for banks, point of sales (POS) for shops, or an internet of things (IoT) device (e.g., an electronic bulb, various sensors, an electricity or gas meter, a sprinkler device, a fire alarm, a thermostat, a streetlamp, a toaster, fitness equipment, a hot-water tank, a heater, a boiler or the like).

In some embodiments, the electronic device may include at least one of a part of the furniture or building/structure, an electronic board, an electronic signature receiving device, a projector, or various meters (e.g., meters for water, electricity, gas or radio waves). In various embodiments, the electronic device may be one or a combination of the above-described devices. An electronic device according to some embodiments may be a flexible electronic device. An electronic device according to an embodiment of the present disclosure will not be limited to the above-described devices, and may include a new electronic device that is provided by the development of technology.

Now, an electronic device according to various embodiments of the present disclosure will be described with reference to the accompanying drawings. As used herein, the term 'user' may refer to a person who uses the electronic device, or a device (e.g., an intelligent electronic device) that uses the electronic device.

FIG. 1 illustrates a network environment including an electronic device according to various embodiments of the present disclosure.

Referring to FIG. 1, an electronic device 101 in a network environment 100 in various embodiments will be described. The electronic device 101 may include a bus 110, a processor 120, a memory 130, an input/output (I/O) interface 150, a display 160 and a communication interface 170. In some embodiments, the electronic device 101 may exclude any one of the components, or may further include other components.

The bus 110 may include, for example, a circuit that connects the components 110 to 170 to each other, and transfers the communication (e.g., a control message and/or data) between the components 110 to 170.

The processor 120 may include one or more of a central processing unit (CPU), an application processor (AP) or a communication processor (CP). The processor 120 may execute, for example, a control and/or communication-related operation or data processing for at least one other component of the electronic device 101.

The processor 120 may be referred to as a controller, or may include the controller as a part thereof.

If it is determined that a network connection request from at least one application is required, the processor 120 according to various embodiments of the present disclosure may check at least one attribute information item of the application. Based on the at least one attribute information item, the processor 120 may determine an access point name (APN) corresponding to the application, and then transmit and receive data of the application to/from the network using the determined APN. The at least one attribute information item of the application may include information about at least one of an identifier (ID) of the application, a user ID, a security level, use/nonuse of a virtual private network (VPN), and a data usage.

The processor 120 may determine a group to which the application belongs, based on the at least one attribute information item, and determine an APN corresponding to the group.

If it is determined based on the at least one attribute information item that the application corresponds to a first application group, the processor 120 may transmit and receive first billing target data to/from the network through the communication interface 170 using the determined APN.

On the other hand, if it is determined based on the at least one attribute information item that the application corresponds to a second application group, the processor 120 may transmit and receive second billing target data to/from the network through the communication interface 170 using the determined APN. The data of the application may be transmitted and received through a packet data network gateway (PGW) corresponding to the determined APN.

Accordingly, data of a plurality of applications can be transmitted to different networks, so the electronic device 101 may be provided with various services from a plurality of networks. In other words, by specifying a particular network from which the electronic device 101 desires to receive a service depending on the type of the application, the electronic device 101 may be provided with the service from the particular network.

The memory 130 may include a volatile and/or non-volatile memory. The memory 130 may store, for example, a command or data related to at least one other component of the electronic device 101. In one embodiment, the memory 130 may store software and/or a program 140. The program 140 may include, for example, a kernel 141, a middleware 143, an application programming interface (API) 145, and/or an application program (or 'application') 147. At least some of the kernel 141, the middleware 143 or the API 145 may be referred to as an operating system (OS).

According to various embodiments of the present disclosure, the memory 130 may store a mapping table in which at least one attribute information item is mapped to each of a plurality of applications. The mapping table may include APN information that is mapped to each of the plurality of applications. For example, for an application for an enterprise service, the APN information may be mapped so that the electronic device 101 may access the network using the enterprise-only APN, and for an application for a personal service, the APN information may be mapped so that the electronic device 101 may access the network using the personal-only APN. In this case, when the user has run any application, the processor 120 may determine an application group to which the run application belongs, and access the network of the mobile operator through any one of a plurality of PGWs using the APN that is mapped to the application group.

In one embodiment, the mapping table may be used by the processor 120 to determine the APN corresponding to the application. The APN information mapped to an application or application group may be APN information that has already been stored in the electronic device 101, and the APN information may be provided by the mobile operator, or may be configured depending on the user's direct input, the message reception, the control signal or the like.

In one embodiment, conditions (i.e., service policy or service rule) for determining to which network the electronic device 101 should transmit the data of each application considering which attribute of the application may also be the condition information that has already been stored in the electronic device 101, and the condition information may be provided by the mobile operator, or may be configured depending on the user's direct input, the message reception, the control signal or the like.

Although the plurality of applications stored in the memory 130 are assumed to use different types of APNs for each application group in various embodiments of the present disclosure, the application classification criteria for allocating different APNs may not be limited thereto. Different APNs may be allocated depending on various classification criteria such as the data transmission capacity and the use time zone which are required during running of the application. Considering the data transmission capacity and the use time zone, it is possible to prevent in advance the data load to any one network.

The kernel 141 may, for example, control or manage the system resources (e.g., the bus 110, the processor 120, the memory 130 or the like) that are used to execute the operation or function implemented in other programs (e.g., the middleware 143, the API 145, the application program 147 or the like). Further, the kernel 141 may provide an interface by which the middleware 143, the API 145 or the application program 147 can control or manage the system resources by accessing the individual components of the electronic device 101.

The middleware 143 may, for example, perform an intermediary role so that the API 145 or the application program 147 may exchange data with the kernel 141 by communicating with the kernel 141. Further, with respect to the work requests received from the application program(s) 147, the middleware 143 may, for example, perform control (e.g., scheduling or load balancing) for the work requests by using a method of assigning a priority capable of using the system resources (e.g., the bus 110, the processor 120, the memory 130 or the like) of the electronic device 101 to any one of the application programs 147.

The API 145 is, for example, an interface by which the application 147 controls the function provided in the kernel 141 or the middleware 143, and may include at least one interface or function (e.g., a command) for, for example, file control, window control, image processing or character control.

The input/output (I/O) interface 150 may, for example, serve as an interface that can deliver a command or data received from the user or other external device to the other components 110 to 140 and 160 to 170 of the electronic device 101. Further, the I/O interface 150 may output a command or data received from the other components 110 to 140 and 160 to 170 of the electronic device 101, to the user or other external devices.

The display 160 may include, for example, a liquid crystal display (LCD) display, a light emitting diode (LED) display, an organic light emitting diode (OLED) display, a microelectromechanical systems (MEMS) display, or an electronic paper display. The display 160 may, for example, display a variety of content (e.g., texts, images, videos, icons, symbols or the like), for the user. The display 160 may include a touch screen, and may receive a touch input, a gesture input, a proximity input or a hovering input made by, for example, an electronic pen or a part of the user's body.

The communication interface 170 may, for example, establish communication between the electronic device 101 and an external device (e.g., a first external electronic device 102, a second external electronic device 104 or a server 106). For example, the communication interface 170 may communicate with the external device (e.g., the second external electronic device 104 or the server 106) by being connected to a network 162 by wireless communication or wired communication.

The wireless communication may include at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro) or global system for mobile communication (GSM), as a cellular communication protocol. The wired communication may include at least one of, for example, universal serial bus (USB), high definition multimedia interface (HDMI), recommended standard 232 (RS-232) or plain old telephone service (POTS). The network 162 may include a telecommunications network, for example, at least one of the computer network (e.g., a local area network (LAN) or a wide area network (WAN)), the Internet or the telephone network.

The communication interface 170 according to various embodiments of the present disclosure may serve to transmit and receive the data of the application to/from the network using the determined APN.

Each of the first and second external electronic devices 102 and 104 may be a device that is the same as or different from the electronic device 101. In one embodiment, the server 106 may include one or more groups of servers.

In various embodiments, all or some of the operations executed in the electronic device 101 may be executed in one or multiple other electronic devices (e.g., the electronic devices 102 and 104 or the server 106). In one embodiment, if the electronic device 101 should perform a certain function or service automatically or upon request, the electronic device 101 may request at least some of the functions related thereto from other electronic devices (e.g., the electronic devices 102 and 104 or the server 106), instead of or in addition to spontaneously executing the function of service. The other electronic devices (e.g., the electronic devices 102 and 104 or the server 106) may execute the requested function or additional function, and deliver the results to the electronic device 101. The electronic device 101 may process the received results intact or additionally, thereby providing the requested function or service. To this end, for example, the cloud computing, distributed computing, or client-server computing technology may be used.

Figure 2:
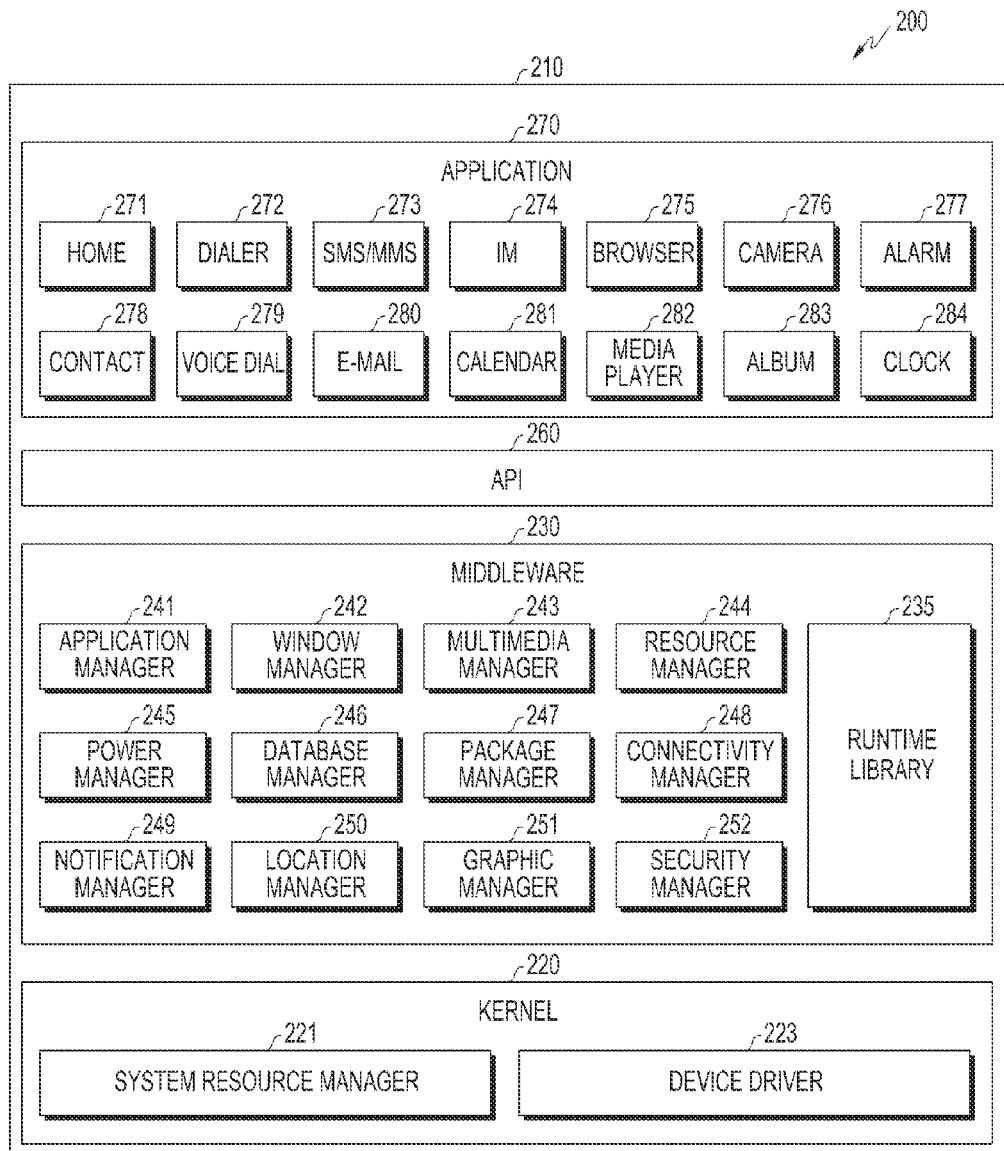
FIG. 2 is a block diagram illustrating a program module according to various embodiments of the present disclosure.

FIG. 2 is a block diagram 200 illustrating a program module 210 according to various embodiments of the present disclosure. In one embodiment, the program module 210 (e.g., the program 140) may include an operating system (OS) for controlling the resources related to an electronic device (e.g., the electronic device 101), and/or a variety of applications (e.g., the application program 147) that run on the operating system. The operating system may be, for example, Android™, iOS™, Windows™, Symbian™, Tizen™, Bada™ or the like.

The program module 210 may include a kernel 220, a middleware 230, an API 260, and/or an application(s) 270. At least a part of the program module 210 may be preloaded on the electronic device 101, or downloaded from a server (e.g., the server 106).

The kernel 220 (e.g., the kernel 141 in FIG. 1) may include, for example, a system resource manager 221 or a device driver 223. The system resource manager 221 may control, allocate or recover the system resources. In one embodiment, the system resource manager 221 may include a process manager, a memory manager, a file system manager or the like. The device driver 223 may include, for example, a display driver, a camera driver, a Bluetooth driver, a shared memory driver, a USB driver, a keypad driver, a wireless fidelity (WiFi) driver, an audio driver, or an inter-process communication (IPC) driver.

The middleware 230 may, for example, provide a function that is required in common by the application(s) 270, or may provide various functions to the application 270 through the API 260 so that the application 270 may efficiently use the limited system resources within the electronic device. In one embodiment, the middleware 230 (e.g., the middleware 143) may include at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The runtime library 235 may include, for example, a library module that a compiler uses to add a new function through a programming language while the application 270 is run. The runtime library 235 may perform an I/O management function, a memory management function, an arithmetic function or the like.

The application manager 241 may, for example, manage the life cycle of at least one of the application(s) 270. The window manager 242 may manage graphic user interface (GUI) resources that are used on the screen. The multimedia manager 243 may determine the format required for playback of various media files, and encode or decode the media files using a codec for the format. The resource manager 244 may manage resources such as a source code a memory or a storage space for any one of the application(s) 270.

The power manager 245 may manage the battery or power by operating with, for example, the basic input/output system (BIOS), and provide power information required for an operation of the electronic device. The database manager 246 may create, search or update the database that is to be used by at least one of the application(s) 270. The package manager 247 may manage installation or update of applications that are distributed in the form of a package file.

The connectivity manager 248 may manage wireless connection such as, for example, WiFi or Bluetooth. The notification manager 249 may display or notify evens such as message arrival, appointments and proximity in a manner that doesn't interfere with the user. The location manager 250 may manage the location information of the electronic device. The graphic manager 251 may manage the graphic effect to be provided to the user, or the user interface related thereto. The security manager 252 may provide various security functions required for system security or user authentication. In one embodiment, if the electronic device (e.g., the electronic device 101) includes a phone function, the middleware 230 may further include a telephony manager for managing the voice or video call function of the electronic device.

The middleware 230 may include a middleware module that forms a combination of various functions of the above-described components. The middleware 230 may provide a module specialized for the type of the operating system in order to provide a differentiated function. Further, the middleware 230 may dynamically remove some of the existing components, or add new components.

The API 260 (e.g., the API 145) is a set of, for example, API programming functions, and may be provided in a different configuration depending on the operating system. For example, for Android™ or iOS™, the API 260 may provide one API set per platform, and for Tizen™, the API 260 may provide two or more API sets per platform.

The application 270 (e.g., the application program 147) may include, for example, one or more applications capable of providing functions such as a home 271, a dialer 272, a short message service/multimedia messaging service (SMS/MMS) 373, an instant message (IM) 274, a browser 275, a camera 276, an alarm 277, a contact 278, a voice dial 279, an Email 280, a calendar 281, a media player 282, an album 283, a clock 284, health care (e.g., for measuring the quantity of exercise, the blood glucose or the like), or environmental information provision (e.g., for providing information about the atmospheric pressure, the humidity, temperature or the like).

In one embodiment, the application 270 may include an application (hereinafter referred to as an 'information exchange application' for convenience of description) for supporting information exchange between the electronic device (e.g., the electronic device 101) and external electronic devices (e.g., the electronic devices 102 and 104). The information exchange application may include, for example, a notification relay application for delivering specific information to the external electronic devices, or a device management application for managing the external electronic devices.

For example, the notification relay application may include a function of delivering notification information generated in other applications (e.g., an SMS/MMS application, an Email application, a healthcare application, an environmental information application or the like) of the electronic device, to the external electronic devices (e.g., the electronic devices 102 and 104). Further, the notification relay application may, for example, receive notification information from an external electronic device, and provide the received notification information to the user. The device management application may, for example, manage at least one function (e.g., a function of adjusting the turn-on/off of the external electronic device itself (or some components thereof) or the brightness (or the resolution) of the display) of the external electronic device (e.g., the electronic devices 102 and 104) communicating with the electronic device, and may manage (e.g., install, delete or update) an application operating in the external electronic device or a service (e.g., a call service or a messaging service) provided in the external electronic device.

In one embodiment, the application 270 may include an application (e.g., a healthcare application) that is specified depending on the attributes (e.g., the attributes of an electronic device, the type of which is a mobile medical device) of the external electronic device (e.g., the electronic devices 102 and 104). In one embodiment, the application 270 may include an application received or downloaded from the external electronic device (e.g., the server 106 or the electronic devices 102 and 104). In one embodiment, the application 270 may include a preloaded application or a third party application that can be downloaded from the server. The names of the components of the shown program module 210 may vary depending on the type of the operating system.

In various embodiments, at least a part of the program module 210 may be implemented by software, firmware, hardware or a combination thereof. At least a part of the program module 210 may be implemented (e.g., executed) by, for example, a processor (e.g., the AP). At least a part of the program module 210 may include, for example, a module, a program, a routine, an instruction set, or a processor, for performing one or more functions.

Figure 3:
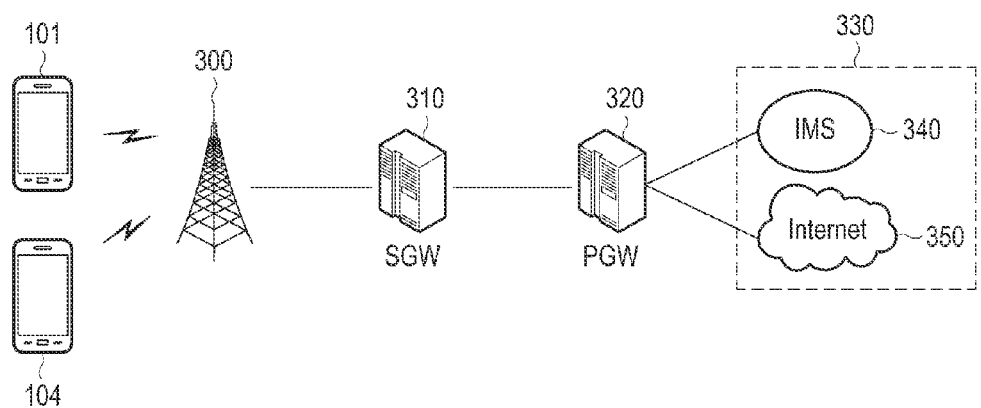
FIG. 3 illustrates a configuration of a wireless communication system according to various embodiments of the present disclosure.

FIG. 3 illustrates a configuration of a wireless communication system according to various embodiments of the present disclosure. Although an evolved packet system (EPS) will be described in detail as an example of the wireless communication system in FIG. 3, various embodiments of the present disclosure may be applied to any other communication systems having the similar technical background with a slight modification without departing from the scope of the present disclosure.

In the wireless communication system in FIG. 3, only the entities related to various embodiments of the present disclosure are shown, and other additional entities may also exist in the system.

Referring to FIG. 3, the wireless communication system may include electronic devices 101 and 104, a cell tower 300, a serving gateway (SGW) 310, a PDN gateway (PGW) 320 and a mobile operator network 330 to which the electronic devices 101 and 104 are connected through the PGW 320.

First, the cell tower 300 may serve to relay communication between the electronic device 101 and the SGW 310, and may be variously defined as base transceiver stations (BTSs), NobeBs or the like according to the mobile communication standard.

The SGW 310 may serve to connect the cell tower 300 to the PGW 320.

The PGW 320 may receive the data to be delivered to the network, from the electronic device 101, and may receive the data to be delivered to the electronic device 101, from the network. The PGW 320 is called a gateway GPRS support node (GGSN), a packet gateway, a packet data network gateway or the like according to the mobile communication standard, and may be responsible for the connection to an external packet switched network (e.g., the Internet, an X.25 network or the like) in response to a connection request from the electronic device 101. Although one PGW 320 is shown in FIG. 3, a plurality of PGWs may be provided.

The public data network (PDN) 330 refers to an independent network in which a server providing a service is located, and may be a network that provides a service to the electronic device 101, such as a multimedia subsystem (IMS) 340, the Internet 350, an operator-dedicated network or the like. For example, the PDN 330 may be a network that the government operates, or over which the private-profit entity generally provides a computer communication service for a fee to the public. The PDN 330 may be implemented in the form of a server that provides billing data or non-billing data to the electronic device 101.

The electronic device 101 may be connected to the PGW 320 and its external network using information about an APN. The electronic device 101 according to various embodiments of the present disclosure may access the network by specifying an APN by which the electronic device 101 should transmit and receive data of a currently running application. Specifically, if an application is run, the electronic device 101 may determine an APN, by which the electronic device 101 should transmit data of the application, among a plurality of APNs by referring to attribute information of the running application or an APN mapping table corresponding to the application, and then access the network corresponding to the APN using the determined APN. Accordingly, the electronic device 101 may transmit or receive data of the application through the network corresponding to the application.

The APN is a name of an access point managed by the network, and may be provided to the electronic device 101. The APN may be used as an identifier for identifying the types of the available services. For example, the APN may include a string or sequence that refers to or distinguishes the PDN 330. As the APN goes through the corresponding PGW 320 to access the requested service or the network (or PDN), the APN may be a name that is defined in advance within the network so as to find the PGW 320. The APN may be configured in different forms according to the mobile communication standard, and may include information about an APN's name, an address, a user name, a password, authentication and the like.

Figure 4:
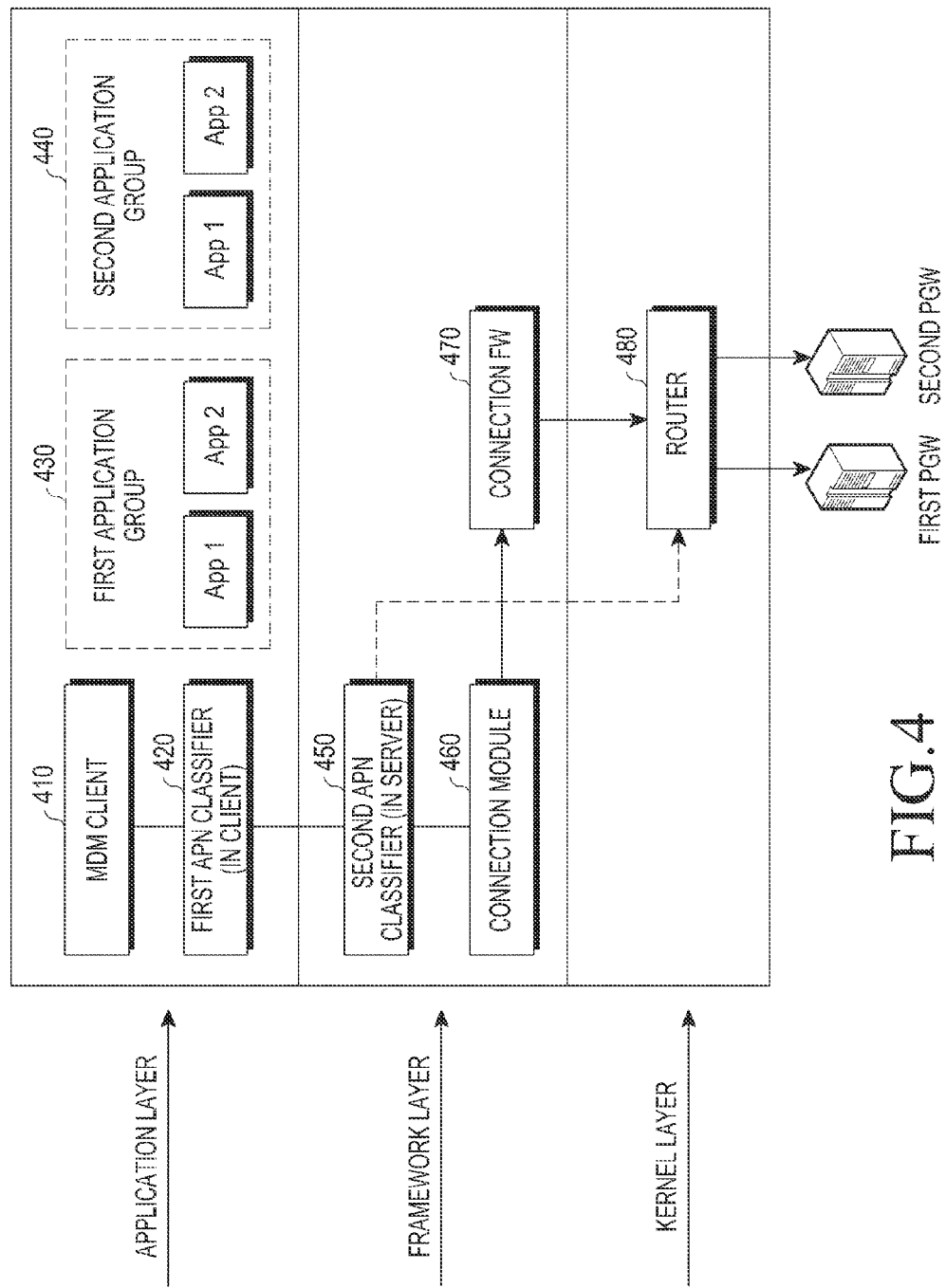
FIG. 4 illustrates a hierarchical structure for distinguishing a network to which data should be transmitted for each application, according to various embodiments of the present disclosure.

FIG. 4 illustrates a hierarchical structure for distinguishing a network to which data should be transmitted for each application, according to various embodiments of the present disclosure. In one embodiment, the software and/or program 140 stored in the memory 130 in FIG. 1 may be implemented in a hierarchical structure as shown in FIG. 4.

Referring to FIG. 4, the electronic device 101 may include an application layer, a framework layer and a kernel layer. First, the application layer is a space in which various applications such as an application for an enterprise service and an application for a personal service are run. The applications running the application layer may be classified into a plurality of groups. Accordingly, a first application group 430 may include applications that can exchange data through the network corresponding to a first APN, and a second application group 440 may include applications that can exchange data through the network corresponding to a second APN. For example, the plurality of application groups may include a user service-related application group and an enterprise service-related application group, and the criteria for grouping applications may be determined in various ways.

A mobile device management (MDM) client 410 included in the application layer may serve to set an APN by communicating with an MDM server.

A first APN classifier 420 may deliver the determined APN information and policy to a second APN classifier 450 of the framework layer. The policy may include information indicating addition or deletion of an application to be mapped to an APN, and connection/disconnection of a VPN. The first APN classifier 420 may be installed through MDM or installed by the user, and may also be installed using a message including an installation uniform resource locator (URL).

The second APN classifier 450 may exist in the framework layer, and may serve to receive information from the first APN classifier 420 or provide information to the first APN classifier 420. Accordingly, the second APN classifier 450 may store and manage the APN mapping information or service policy received from the first APN classifier 420 as in the memory 130 in FIG. 1. Further, the second APN classifier 450 may directly deliver the APN mapping information or policy to a router 480, or may deliver the APN mapping information or policy to the router 480 through a connection module 460. Some or all operations in the first APN classifier 420 may be implemented so as to be performed in the DMD client 410, and some or all operations in the second APN classifier 450 may be implemented so as to be performed in the connection module 460.

The connection module 460 may serve to fetch the service policy from the second APN classifier 450 and invoke the service so as to perform a function corresponding to the policy. In response, a connection framework (FW) 470 may perform a network connection-related API. The connection module 460 may determine which APN it will allocate, including the application information, in response to a request from the second APN classifier 450. To this end, the connection module 460 may request the APN mapping information or policy that is managed in the second APN classifier 450. Accordingly, based on the APN mapping information or policy provided from the second APN classifier 450, the connection module 460 may determine which APN it will map to the application in which network connection is requested.

The router 480 may determine an IP address to which data of an application mapped to the APN is to be transmitted, using the packet filtering technology, so that the data may be transmitted to the network corresponding to the determined IP address. Further, based on the APN mapping information or policy provided from the second APN classifier 450, the router 480 may determine which APN it will map to the application in which network connection is requested, on behalf of the connection module 460.

The above-described operations in components of each layer may be performed by the processor 120 in FIG. 1.

Figure 5:
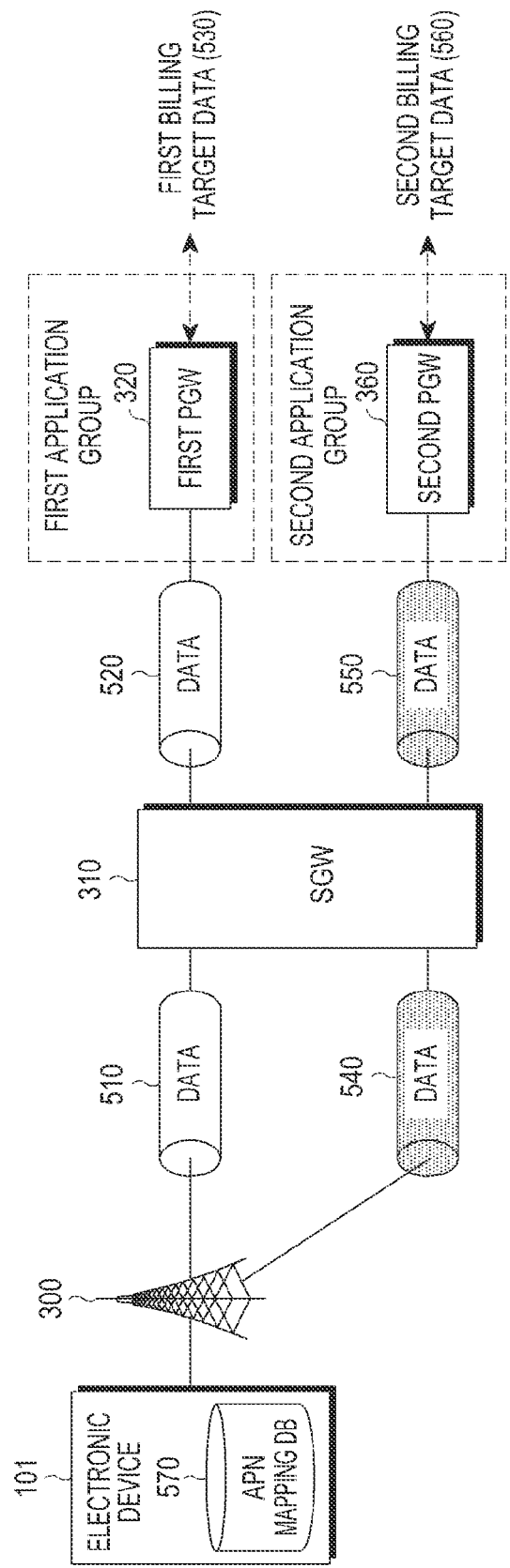
FIG. 5 illustrates an application-specific data transmission process according to various embodiments of the present disclosure.

FIG. 5 illustrates an application-specific data transmission process according to various embodiments of the present disclosure.

Referring to FIG. 5, if at least one application is run, the electronic device 101 may refer to an APN mapping database (DB) 570 in the memory 130 in order to determine through which PGW the electronic device 101 will send data of the running application to which PDN. In a case where an application belonging to a first application group is run, when delivering data of the application to the network, the electronic device 101 may determine a PGW to which the data is delivered, depending on first APN information corresponding to the application. Accordingly, if data 510 is delivered to the SGW 310 through the cell tower 300 using the first APN information, the SGW 310 may deliver data 520 to the first PGW 320 corresponding to the first APN information. The first PGW 320 may deliver the data to the PDN that provides a service corresponding to the first application group, and an example of the delivered data may be first billing target data. The SGW 310 may be a router that is mounted in common in the middle of the network.

On the other hand, in a case where an application belonging to a second application group is run, when delivering data of the application to the network, the electronic device 101 may determine a PGW to which the data is delivered, depending on second APN information corresponding to the application. Accordingly, if data 540 is delivered to the SGW 310 through the cell tower 300 using the second APN information, the SGW 310 may deliver data 550 to a second PGW 360 corresponding to the second APN information. The second PGW 360 may deliver the data to the PDN that provides a service corresponding to the second application group, and an example of the delivered data may be second billing target data. Each of the first billing target data and the second billing target data may correspond to any one of billing data and non-billing data. For example, both of the first billing target data and the second billing target data may be billing data. In this case, the first billing target data and the second billing target data may be differently determined in terms of billing amount.

Accordingly, the electronic device 101 may transmit data through different PGWs for each application. Thus, an operator of the mobile communication network can collect a history of the use of the application in the electronic device 101, so the mobile operator may determine the billing target data. In other words, the operator of the mobile communication network may distinguish and record the data that arrives at each PGW or that is sent for each APN. Accordingly, the operator of the mobile communication network may perform a function such as separated billings based on the recorded information. For example, since it is possible to distinguish the data used through the company website and the data used in working hours, the mobile operator may readily determine whether the data is subject to billing.

Figure 6:
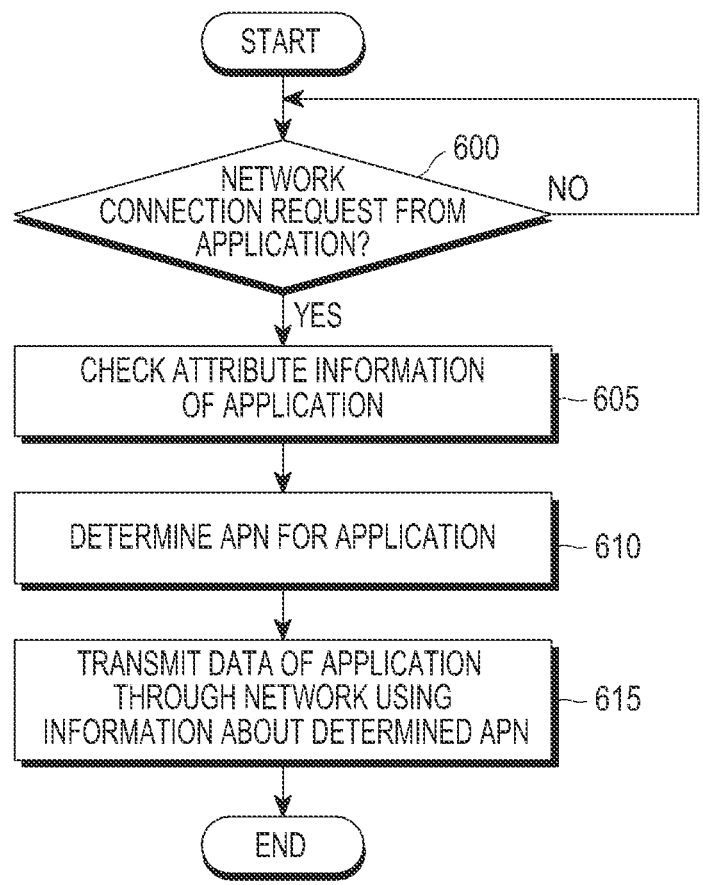
FIG. 6 is a flowchart illustrating an operation of determining an APN corresponding to an application according to various embodiments of the present disclosure.

FIG. 6 is a flowchart illustrating an operation of determining an APN corresponding to an application according to various embodiments of the present disclosure.

Referring to FIG. 6, the processor 120 may determine in operation 600 whether there is a network connection request from an application. If a network connection request has occurred, the processor 120 may check attribute information of the application in operation 605, and determine an APN for the application in operation 610. In operation 615, the processor 120 may transmit data of the application to the network using information about the determined APN. At least one attribute information item of the application may include information about at least one of an ID of the application, a user ID, a security level, use/nonuse of a VPN, and a data usage.

As for whether to determine an APN using a certain attribute information item among at least one attribute information item of the application, it may be determined based on the service policy. In one embodiment, an APN corresponding to the application may be determined based on the service policy and the mapping table in which at least one attribute information item is mapped to each of a plurality of applications. In one embodiment, as for a mapping table having APN information that is mapped to each of the plurality of applications, the electronic device may determine an APN corresponding to the application referring to the mapping table.

Figure 7:
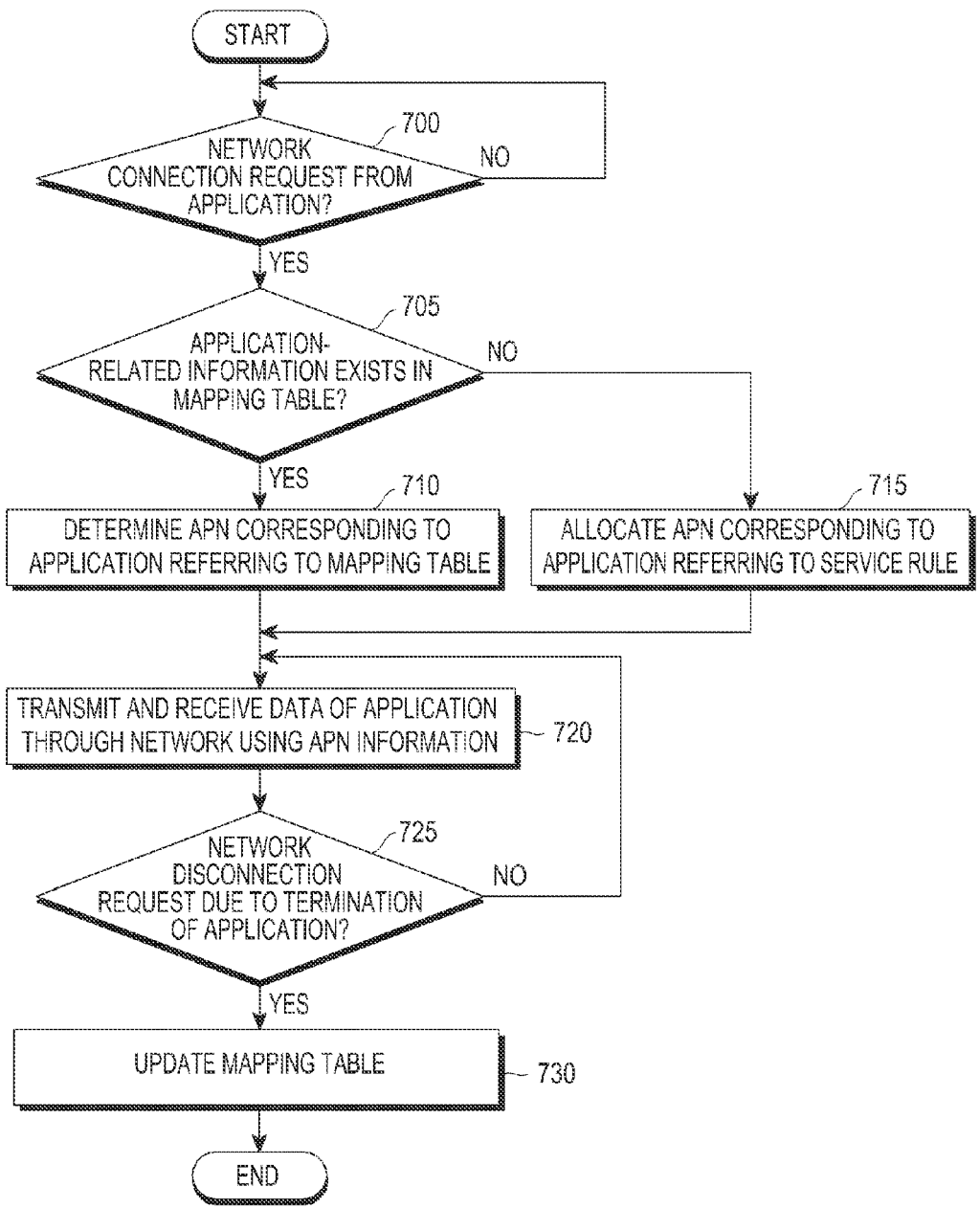
FIG. 7 is a flowchart illustrating an operation of determining an APN corresponding to an application using a mapping table according to various embodiments of the present disclosure.

FIG. 7 is a flowchart illustrating an operation of determining an APN corresponding to an application using a mapping table according to various embodiments of the present disclosure.

Referring to FIG. 7, the processor 120 may determine in operation 700 whether there is a network connection request from an application. If a network connection request has occurred, the processor 120 may determine in operation 705 whether information related to the application (or application-related information) exists in a mapping table in which at least one attribute information item is mapped to each of a plurality of applications. If there is a mapping table corresponding to the application, the processor 120 may determine an APN corresponding to the application referring to the mapping table in operation 710. On the other hand, if there is no mapping table corresponding to the application, the processor 120 may allocate an APN corresponding to the application referring to the service rule in operation 715.

In operation 720, the processor 120 may transmit and receive data of the application to/from the network using the APN information. Thereafter, the processor 120 may determine in operation 725 whether there is a network disconnection request caused by termination of the application. If there is no network disconnection request, the processor 120 may return to operation 720 and repeatedly perform the above-described operation. On the other hand, if there is a network disconnection request, the processor 120 may update the mapping table in operation 730. In a case where there is no item for the application in the mapping table, the mapping table may be updated so that the application item may be added.

Reference will be made to FIGS. 8A and 8B to describe the mapping table in detail.

FIGS. 8A and 8B illustrate mapping tables according to various embodiments of the present disclosure.

First, FIG. 8A illustrates a mapping table in which at least one attribute information item is mapped to each of a plurality of applications, and FIG. 8B illustrates a mapping table in which at least one attribute information item and APN information are mapped together to each of a plurality of applications.

Referring to FIGS. 8A and 8B, at least one attribute information item of an application may include, for example, information about an application name (Name) 800, an application's ID (UID) 805, a user ID 810, a security level 815, use/nonuse of a VPN 820, and data usage (Data) 825.

A field of the application's ID 805 may be used to designate and manage an application group for each APN. For example, the same application ID 805 may be allocated to applications belonging to one group.

A field of the user ID 810 may be used to allocate different APNs to user-specific applications by designating different applications for different users in a multi-user environment. For example, if user IDs of a first application and a second application are '1' and a user ID of a third application is '2', it may be determined that the first and second applications belong to the same group and the third application belongs to a different group. Accordingly, a first APN may be allocated to a group to which the first and second applications belong, and a second APN may be allocated to a group to which the third application belongs. Assuming that in a case where a user ID is '1', it indicates an application for a personal service, a first APN for a personal service (or a private service) may be allocated to a group corresponding to the case where a user ID is '1'. In this way, the field corresponding to a user ID may be used to indicate a user, or determine whether the application is a personal application or a business application.

Further, at least one application-specific attribute information item may be stored in the form of a field that is 1:1 mapped to each application separately, or may be stored in the form of integrated information.

Further, a field of the security level 815 may be used to set a security level specified for each application.

Since one or more attribute information items are mapped to each application and stored as described above, in determining which APN the electronic device 101 will use for each application, the electronic device 101 may use at least one of the attribute information items such as the application ID 805 and the user ID 810 as the criteria in various ways.

For example, in a case where the electronic device 101 is connected to the network in roaming or a plurality of APNs are not operating (i.e., the electronic device 101 should use only a single APN), data usage 825 may be accumulated and updated for each application so that the mobile network operator may determine the billing target data.

Further, the VPN field 820 may be used to transmit data of the application or application group to the VPN depending on whether the electronic device 101 is connected to the VPN. For example, even if WiFi is mapped to a first application group, setting information of the VPN field 820 may be used in using a data network rather than WiFi for security reasons. Further, even if non-authenticated WiFi is mapped, setting information of the VPN field 820 may be used in using the data network.

Figure 9:
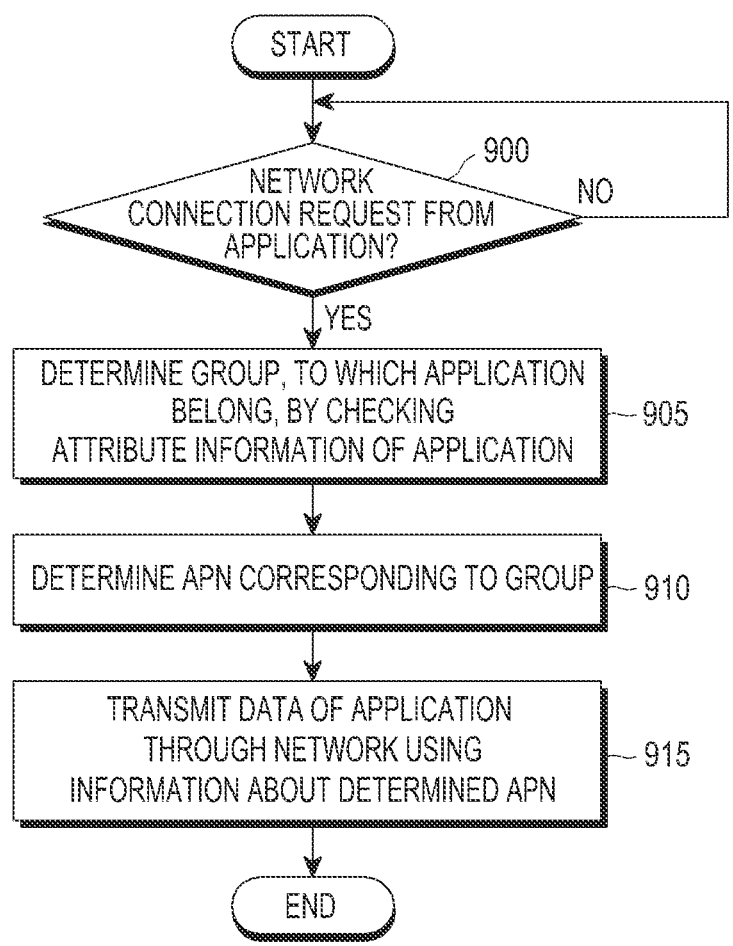
FIG. 9 is a flowchart illustrating an operation of determining an APN using attribute information of an application according to various embodiments of the present disclosure.

FIG. 9 is a flowchart illustrating an operation of determining an APN using attribute information of an application according to various embodiments of the present disclosure.

Referring to FIG. 9, the processor 120 may determine in operation 900 whether there is a network connection request from an application. If a network connection request has occurred, the processor 120 may check attribute information of the application in operation 905 to determine a group to which the application belongs. For example, by checking a user ID in the attribute information of application, the processor 120 may determine a group to which the application belongs. As to determining which attribute information item among the attribute information items of the application or which attribute information items the processor 120 will use, it may be determined according to a predetermined service policy.

Therefore, if a group to which the application belongs is determined, the processor 120 may determine an APN corresponding to the group in operation 910. In operation 915, the processor 120 may transmit data of the application to the network using the APN information.

Figure 10:
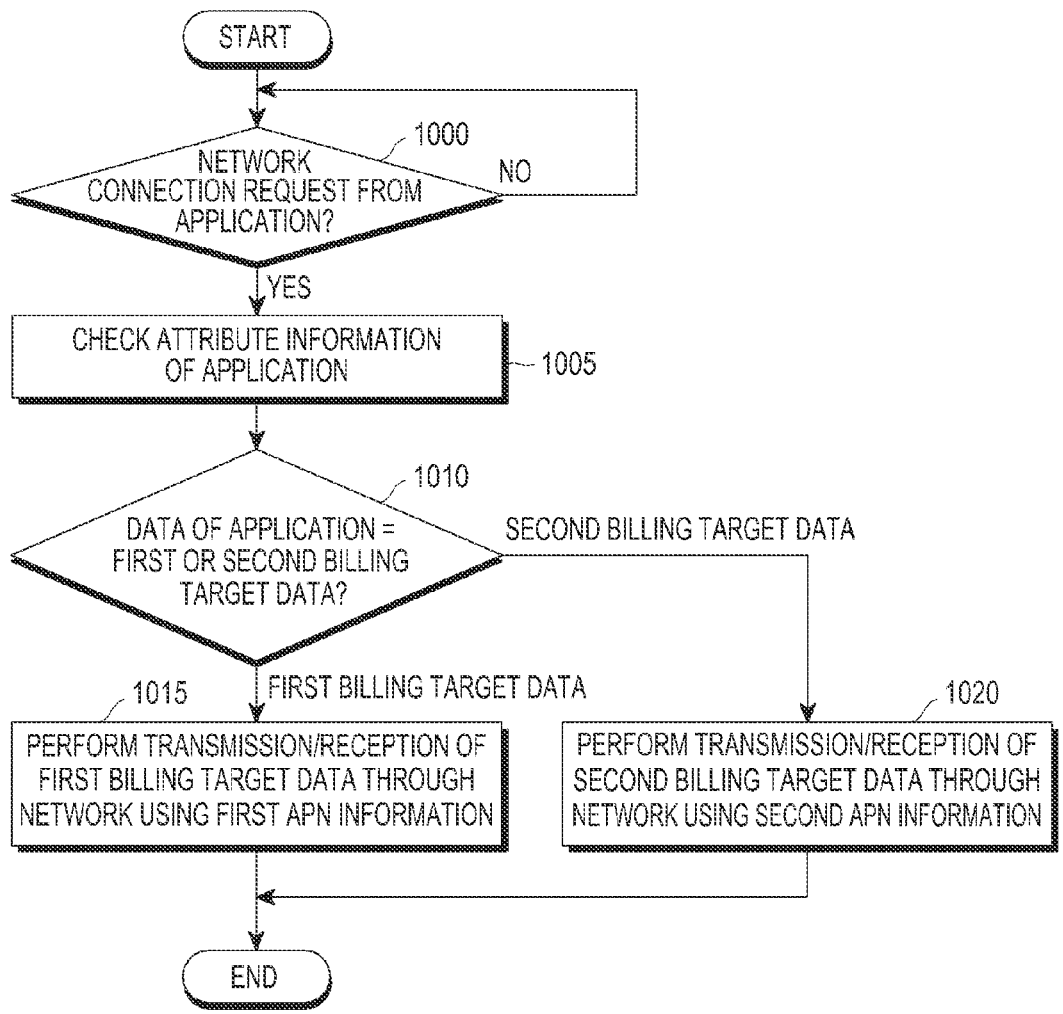
FIG. 10 is a flowchart illustrating an operation of determining an APN corresponding to billing target data using attribute information of an application according to various embodiments of the present disclosure.

FIG. 10 is a flowchart illustrating an operation of determining an APN corresponding to billing target data using attribute information of an application according to various embodiments of the present disclosure.

Referring to FIG. 10, the processor 120 may determine in operation 1000 whether there is a network connection request from an application. If a network connection request has occurred, the processor 120 may check attribute information of the application in operation 1005. The processor 120 may determine in operation 1010 whether data of the application is first billing target data or second billing target data. As to determining whether data of the application is subject to billing, it may be determined according to the service policy.

If the data of the application is first billing target data, the processor 120 may transmit and receive first billing target data through the network using first APN information in operation 1015. On the other hand, if the data of the application is second billing target data, the processor 120 may transmit and receive second billing target data through the network using second APN information in operation 1020.

Figure 11:
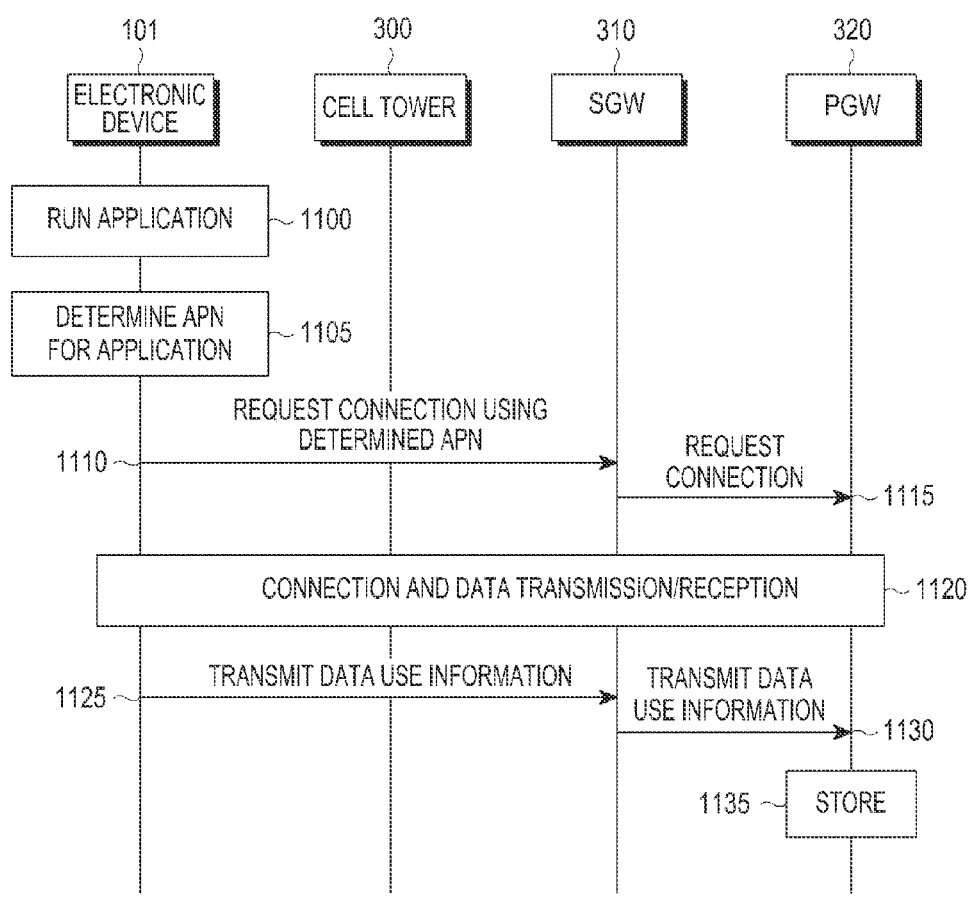
FIG. 11 is a flowchart illustrating a process of transmitting data using an APN corresponding to an application according to various embodiments of the present disclosure.

FIG. 11 is a flowchart illustrating a process of transmitting data using an APN corresponding to an application according to various embodiments of the present disclosure.

Referring to FIG. 11, as an application is run by the user in operation 1100, the electronic device 101 may determine an APN for the application in operation 1105, for execution of the application. If the electronic device 101 sends a connection request to the SGW 310 through the cell tower 300 using the determined APN in operation 1110, the SGW 310 may forward the connection request to the PGW 320 corresponding to the APN in operation 1115. Through this connection request, a PDN connection between the electronic device 101 and the PGW 320 may be made, and data of the application can be transmitted and received through the PDN connection in operation 1120.

Thereafter, the electronic device 101 may transmit data use information to the SGW 310 in operation 1125 so that the mobile network operator may perform billing depending on the data transmission/reception. In operation 1130, the SGW 310 may forward the data use information to the PGW 320. In operation 1135, the PGW 320 may store the data use information. Although the data use information is assumed to be stored in the PGW 320 in FIG. 11, in a case where the PDN connected to the PGW 320 is implemented in the form of a server, the data use information may be stored in the server. In other words, the data use information may be stored in any storage space as long as it is managed by the mobile network operator.

Figure 12:
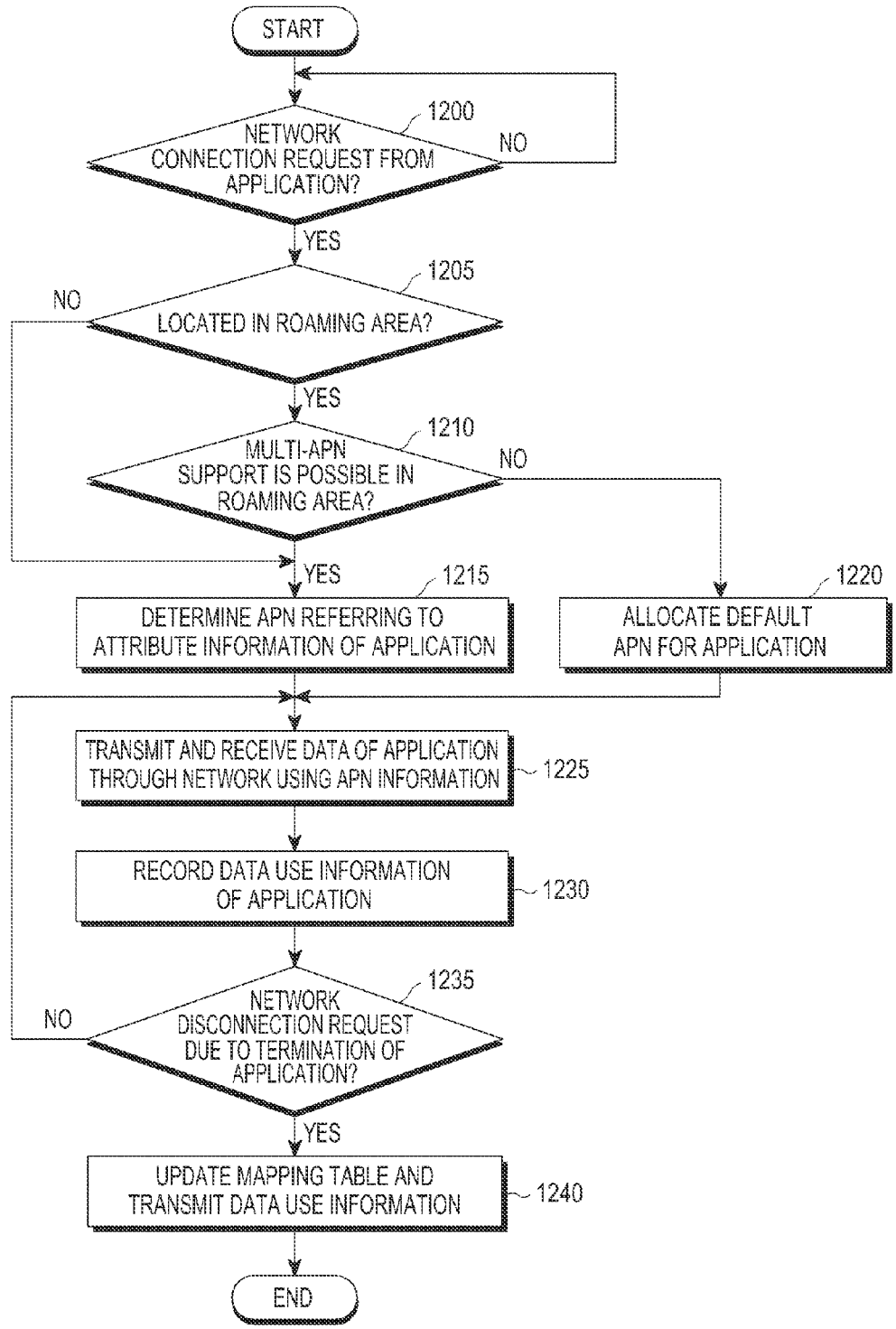
FIG. 12 is a flowchart illustrating an operation of determining an APN using attribute information of an application during roaming according to various embodiments of the present disclosure.

FIG. 12 is a flowchart illustrating an operation of determining an APN using attribute information of an application during roaming according to various embodiments of the present disclosure.

Referring to FIG. 12, the processor 120 may determine in operation 1200 whether there is a network connection request from an application. If a network connection request has occurred, the processor 120 may determine in operation 1205 whether the electronic device 101 is located in a roaming area. The processor 120 may that the electronic device 101 is located in a roaming area, if the network is changed. If it is determined that the electronic device 101 is located in a roaming area, the processor 120 may determine in operation 1210 whether multi-APN support is possible in the roaming area.

The electronic device 101 may determine whether multi-APN support is possible, by transmitting, to each APN, arbitrary test data for checking the network environment. The electronic device 101 may determine that multi-APN support is possible, if the electronic device 101 receives a response to the test data from a plurality of APNs. Further, the electronic device 101 may determine whether multi-APN support is possible, by transmitting a command inquiring whether to support multiple APNs to the network and then receiving a response thereto.

If it is determined through the above-described operations that multi-APN support is possible, the electronic device 101 may determine an APN referring to the attribute information of the application in the above-described method in operation 1215. On the other hand, if multi-APN support is not possible (e.g., if only single APN is possible), the processor 120 may allocate a default APN to the application in operation 1220. In other words, the processor 120 may allocate the single APN.

As for whether to determine an APN using a certain attribute information item among at least one attribute information item of the application, it may be determined based on the service policy. In one embodiment, an APN corresponding to the application may be determined based on the service policy and the mapping table in which at least one attribute information item is mapped to each of a plurality of applications. In one embodiment, as for a mapping table having APN information that is mapped to each of the plurality of applications, the electronic device 101 may determine an APN corresponding to the application referring to the mapping table.

In operation 1225, the processor 120 may transmit and receive data of the application to/from the network using the APN information. While transmitting and receiving the data, the processor 120 may record data use information of the application in operation 1230. The processor 120 may determine in operation 1235 whether there is a network disconnection request caused by termination of the application, and unless there is a network disconnection request, the processor 120 may return to operation 1225 and repeatedly perform the above-described operation. On the other hand, if there is a network disconnection request, the processor 120 may update the mapping table and then transmit the data use information to the network in operation 1240. In a case where multiple APNs are supported, the data use information may be transmitted to a PGW of each APN for each application.

Figure 13:
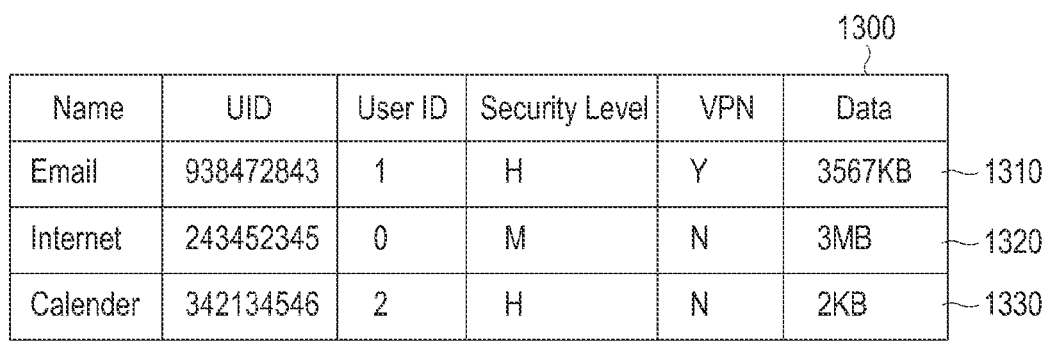
FIG. 13 illustrates a mapping table that is updated in the roaming area according to various embodiments of the present disclosure.

FIG. 13 illustrates a mapping table that is updated in the roaming area according to various embodiments of the present disclosure.

Referring to FIG. 13, data use information 1300 (e.g., data usages 1310, 1320 and 1330) may be accumulated and updated, for each application used in the roaming area. Accordingly, the mobile operator may efficiently determine the billing target data by collecting the data usages 1310, 1320 and 1330.

Figure 14:
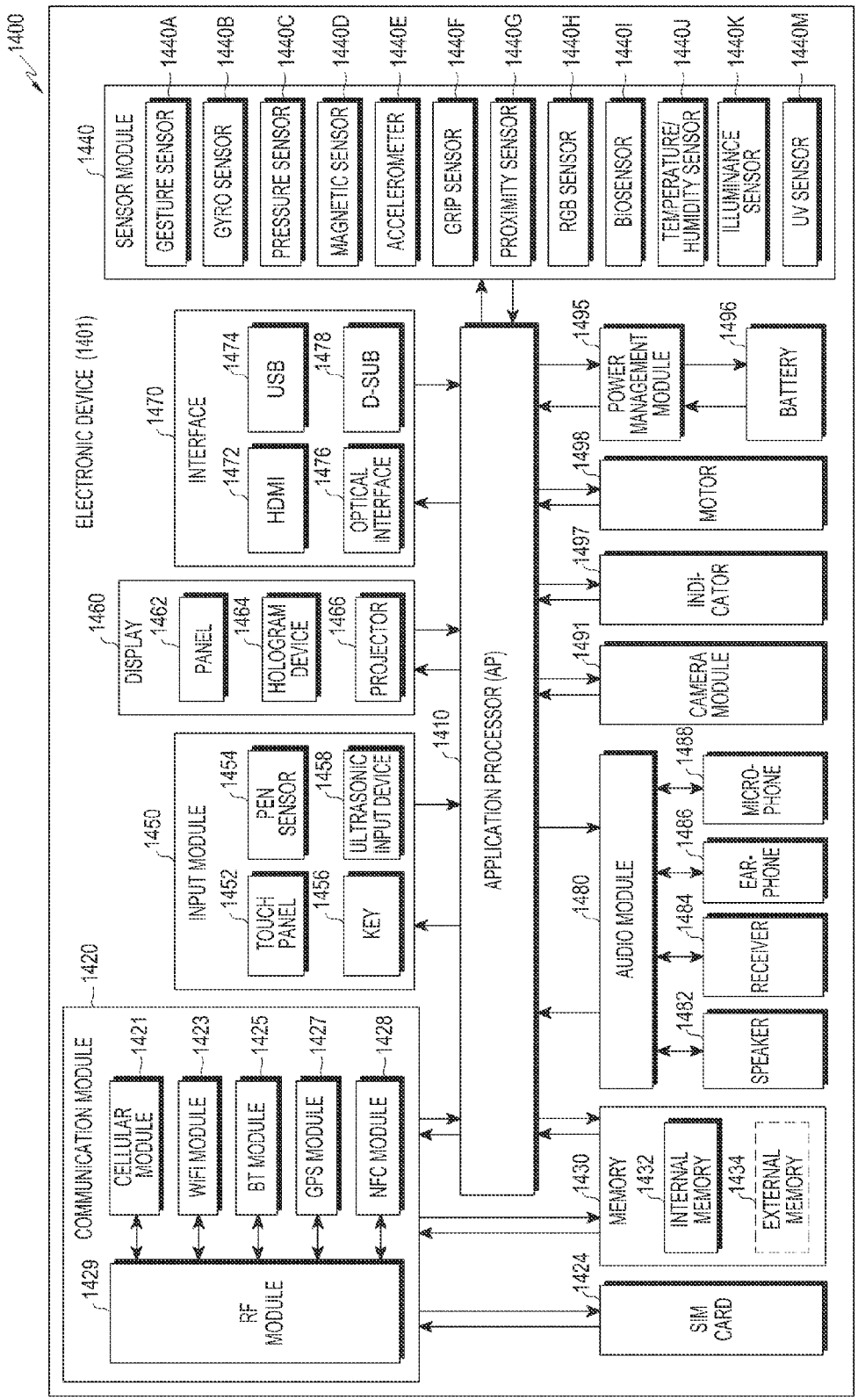
FIG. 14 is a block diagram illustrating an electronic device according to various embodiments of the present disclosure.

FIG. 14 is a block diagram 1400 illustrating an electronic device 1401 according to various embodiments of the present disclosure.

Referring to FIG. 14, the electronic device 1401 may include, for example, all or some components of the electronic device 101 shown in FIG. 1. The electronic device 1401 may include at least application processor (AP) 1410, a communication module 1420, a subscriber identification module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may control a plurality of hardware or software components connected to the AP 1410 by running, for example, the operating system or application program, and may process and calculate various data. The AP 1410 may be implemented as, for example, a system on chip (SoC). In one embodiment, the AP 1410 may further include a graphic processing unit (GPU) and/or an image signal processor. The AP 1410 may include at least some (e.g., a cellular module 1421) of the components shown in FIG. 14. The AP 1410 may load, on a volatile memory, a command or data received from at least one of other components (e.g., non-volatile memory) and process the loaded data, and may store a variety of data in a non-volatile memory.

The communication module 1420 may have a structure which is the same as or similar to that of the communication interface 170 in FIG. 1. The communication module 1420 may include for example, the cellular module 1421, a WiFi module 1423, a Bluetooth (BT) module 1425, a GPS module 1427, an NFC module 1428, and a radio frequency (RF) module 1429.

The cellular module 1421 may, for example, provide a voice call service, a video call service, a messaging service or an Internet service over a communication network. In one embodiment, the cellular module 1421 may identify and authenticate the electronic device 1401 within the communication network using a subscriber identification module (e.g., the SIM card 1424). In one embodiment, the cellular module 1421 may have some of the functions that can be provided by the AP 1410. In one embodiment, the cellular module 1421 may include a communication processor (CP).

Each of the WiFi module 1423, the BT module 1425, the GPS module 1427 or the NFC module 1428 may include, for example, a processor for processing the data transmitted or received through the corresponding module. In some embodiments, at least some (e.g., two or more) of the cellular module 1421, WiFi module 1423, the BT module 1425, the GPS module 1427 or the NFC module 1428 may be included in one integrated chip (IC) or IC package.

The RF module 1429 may, for example, transmit and receive communication signals (e.g., RF signals). The RF module 1429 may include, for example, a transceiver, a power amplifier module (PAM), a frequency filter, a low noise amplifier (LNA) or an antenna. In another embodiment, at least one of the cellular module 1421, the WiFi module 1423, the BT module 1425, the GPS module 1427 or the NFC module 1428 may transmit and receive RF signals through a separate RF module.

The SIM card 1424 may include, for example, a card with a subscriber identification module and/or an embedded SIM. The SIM card 1424 may include unique identification information (e.g., integrated circuit card identifier (ICCID)) or subscriber information (e.g., international mobile subscriber identity (IMSI)).

The memory 1430 (e.g., the memory 130) may include, for example, an internal memory 1432 or an external memory 1434. The internal memory 1432 include at least one of, for example, a volatile memory (e.g., dynamic RAM (DRAM), static RAM (SRAM), synchronous dynamic RAM (SDRAM) or the like) or a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., a NAND flash, a NOR flash or the like)), hard drive, or solid state drive (SSD).

The external memory 1434 may further include a flash drive, for example, compact flash (CF), secure digital (SD), micro secure digital (Micro-SD), mini secure digital (Mini-SD), extreme digital (xD), a memory stick or the like. The external memory 1434 may be functionally and/or physically connected to the electronic device 1401 through various interfaces.

The sensor module 1440 may, for example, measure the physical quantity or detect the operating status of the electronic device 1401, and convert the measured or detected information into an electrical signal. The sensor module 1440 may include at least one of, for example, a gesture sensor 1440A, a gyro sensor 1440B, a pressure sensor 1440C, a magnetic sensor 1440D, an accelerometer 1440E, a grip sensor 1440F, a proximity sensor 1440G, a color sensor (e.g., red, green, blue (RGB) sensor) 1440H, a biosensor 1440I, a temperature/humidity sensor 1440J, an illuminance sensor 1440K, or a ultra violet (UV) sensor 1440M. Additionally or alternatively, the sensor module 1440 may include, for example, an E-nose sensor, an electromyography (EMG) sensor, an electroencephalogram (EEG) sensor, an electrocardiogram (ECG) sensor, an infra red (IR) sensor, an iris sensor and/or a fingerprint sensor. The sensor module 1440 may further include a control circuit for controlling at least one or more sensors belonging thereto. In some embodiments, the electronic device 1401 may further include a processor configured to control the sensor module 1440, separately or as a part of the AP 1410, and may control the sensor module 1440 while the AP 1410 is in a sleep state.

The input device 1450 may include, for example, a touch panel 1452, a (digital) pen sensor 1454, a key 1456, or an ultrasonic input device 1458. The touch panel 1452 may use at last one of, for example, capacitive, resistive, infrared or ultrasonic scheme. The touch panel 1452 may further include a control circuit. The touch panel 1452 may further include a tactile layer, to provide a tactile or haptic feedback to the user.

The (digital) pen sensor 1454, for example, may be a part of the touch panel 1452, or may include a separate recognition sheet. The key 1456 may include, for example, a physical button, an optical key or a keypad. The ultrasonic input device 1458 may check data by detecting sound waves with a microphone (e.g., a microphone 1488) in the electronic device 1401 through an input tool for generating an ultrasonic signal.

The display 1460 (e.g., the display 160) may include a panel 1462, a hologram device 1464, or a projector 1466. The panel 1462 may include a structure which is the same as or similar to that of the display 160 in FIG. 1. The panel 1462 may be implemented to be, for example, flexible, transparent or wearable. The panel 1462, together with the touch panel 1452, may be implemented as one module. The hologram device 1464 may show stereoscopic images in the air using the interference of the light. The projector 1466 may display images by projecting the light on the screen. The screen may be disposed on the inside or outside of, for example, the electronic device 1401. In one embodiment, the display 1460 may further include a control circuit for controlling the panel 1462, the hologram device 1464, or the projector 1466.

The interface 1470 may include, for example, an HDMI 1472, a USB 1474, an optical interface 1476 or D-subminiature (D-sub) 1478. The interface 1470 may be included in, for example, the communication interface 170 shown in FIG. 1. Additionally or alternatively, the interface 1470 may include, for example, a mobile high-definition link (MHL) interface, a secure digital (SD) card/multi-media card (MMC) interface or an infrared data association (IrDA) interface.

The audio module 1480, for example, may convert the sound and electrical signals bi-directionally. At least some components of the audio module 1480 may be included in, for example, the I/O interface 150 shown in FIG. 1. The audio module 1480 may process the sound information that is received or output through, for example, a speaker 1482, a receiver 1484, an earphone 1486 or the microphone 1488.

The camera module 1491 is, for example, a device capable of capturing still images and videos. In one embodiment, the camera module 1491 may include one or more image sensors (e.g., a front image sensor or a rear image sensor), a lens, an image signal processor (ISP), or a flash (e.g., an LED or xenon lamp).

The power management module 1495, for example, may manage the power of the electronic device 1401. In one embodiment, the power management module 1495 may include, for example, a power management integrated circuit (PMIC), a charger integrated circuit (IC), or a battery or fuel gauge. The PMIC may have a wired and/or wireless charging scheme. The wireless charging scheme may include, for example, a magnetic resonance scheme, a magnetic induction scheme, or an electromagnetic scheme, and the power management module 1495 may further include additional circuits (e.g., a coil loop, a resonance circuit, a rectifier or the like) for wireless charging. The battery or fuel gauge may, for example, measure the remaining capacity, charging voltage, charging current or temperature of the battery 1496. The battery 1496 may include, for example, a rechargeable battery and/or a solar battery.

The indicator 1497 may indicate specific status (e.g., boot status, message status, charging status or the like) of the electronic device 1401 or a part (e.g. the AP 1410) thereof. The motor 1498 may convert an electrical signal into mechanical vibrations, thereby generating a vibration or haptic effect. Although not shown, the electronic device 1401 may include a processing device (e.g., GPU) for mobile TV support. The processing device for mobile TV support may process media data based on the standards such as, for example, digital multimedia broadcasting (DMB), digital video broadcasting (DVB) or mediaFLO.

Each of above-described components of the electronic device 1401 may be configured with one or more components, and names of the components may vary depending on the type of the electronic device 1401. In various embodiments, the electronic device 1401 may include at least one of the above-described components, some of which may be omitted, or may further include additional other components. Further, some of the components of the electronic device 1401 according to various embodiments of the present disclosure may be configured as one entity by being combined, thereby performing the previous functions of the components in the same manner.

As is apparent from the foregoing description, according to various embodiments of the present disclosure, since the electronic device can identify the network to which data should be transmitted for each application, the electronic device may transmit and receive data of the application in use to/from the corresponding network using information about the identified network. Accordingly, the mobile operator may efficiently collect the billing target data.

Further, according to various embodiments of the present disclosure, the electronic device may separately manage applications that use the same type of network, making it possible to provide various additional functions corresponding to the application properties.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method for managing network access, the method comprising:
   determining whether there is a network connection request from at least one application;
   checking attribute information of the at least one application, wherein the attribute information comprises a user ID and a data usage;
   determining an access point name (APN) corresponding to the at least one application based on the data usage, the data usage is amount of data transmitted and received by the at least one application accumulated over time; and
   transmitting and receiving data of the at least one application to/from a network using the determined APN.

2. The method of claim 1, further comprising:
   storing a mapping table in which at least one attribute information is mapped to each of a plurality of applications.

3. The method of claim 2, wherein the mapping table further comprises APN information that is mapped to each of the plurality of applications.

4. The method of claim 1, wherein the data of the at least one application is transmitted and received through a packet data network gateway (PGW) corresponding to the determined APN.

5. An electronic device for managing network access, the electronic device comprising:
   a processor configured to:
      determine that there is a network connection request from at least one application,
      check attribute information of the at least one application, the attribute information comprising a user ID and a data usage, and
      determine an access point name (APN) corresponding to the at least one application based on the data usage, the data usage is amount of data transmitted and received by the at least one application accumulated over time; and
   a transceiver configured to transmit and receive data of the at least one application to/from a network using the determined APN.

6. The electronic device of claim 5, further comprising:
   a memory configured to store a mapping table,
   wherein the mapping table comprises a mapping of at least one attribute information to each of a plurality of applications.

7. The electronic device of claim 6, wherein the mapping table further comprises APN information that is mapped to each of the plurality of applications.

8. The electronic device of claim 5, wherein the data of the at least one application is transmitted and received through a packet data network gateway (PGW) corresponding to the determined APN.

* * * * *